United States Patent
Shao et al.

(10) Patent No.: US 9,355,480 B1
(45) Date of Patent: May 31, 2016

(54) UNIFORM DISTRIBUTION OF VISUAL COMPONENT WIDTHS

(71) Applicant: EMC Corporation, Hopkinton, MA (US)

(72) Inventors: Chuan Shao, Shanghai (CN); Shouyuan Cheng, Shanghai (CN); Yingjun Xu, Shanghai (CN); Natalie Lee Chin Wong, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 309 days.

(21) Appl. No.: 14/040,209

(22) Filed: Sep. 27, 2013

(51) Int. Cl.
*G06T 11/20* (2006.01)

(52) U.S. Cl.
CPC .................................. *G06T 11/206* (2013.01)

(58) Field of Classification Search
CPC ........ G06T 11/206; G06T 15/005; G06T 1/20
USPC .............. 345/418, 440, 440.2, 443, 501, 522, 345/619
See application file for complete search history.

(56) References Cited

U.S. PATENT DOCUMENTS

| | | | |
|---|---|---|---|
| 5,805,171 A | 9/1998 | St. Clair et al. | |
| 8,914,740 B1* | 12/2014 | Joos | G06F 3/048 345/440 |
| 8,933,971 B2 | 1/2015 | Washington et al. | |
| 2006/0028471 A1* | 2/2006 | Kincaid | G06T 11/206 345/440 |
| 2008/0059899 A1* | 3/2008 | Gemmell | G06F 17/30991 715/767 |
| 2008/0238856 A1 | 10/2008 | Bhowmik et al. | |
| 2010/0281372 A1* | 11/2010 | Lyons | G11B 27/034 715/720 |
| 2013/0139080 A1* | 5/2013 | Thies | G06F 3/048 715/764 |

* cited by examiner

*Primary Examiner* — Xiao Wu
*Assistant Examiner* — Sarah Lhymn
(74) *Attorney, Agent, or Firm* — BainwoodHuang

(57) ABSTRACT

Improved techniques involve uniformly distributing remainder pixels to the visual components when distributing the visual components in a display of a fixed pixel width. When displaying a number of visual components on the display, an electronic device connected to the display generates remainder pixels that are the result of the quotient of the number of display pixels and the number of visual components not being a whole number. The electronic device then distributes the remainder pixels to the visual components in a uniform manner so that each visual component is aligned with a respective visual target in the display.

19 Claims, 4 Drawing Sheets

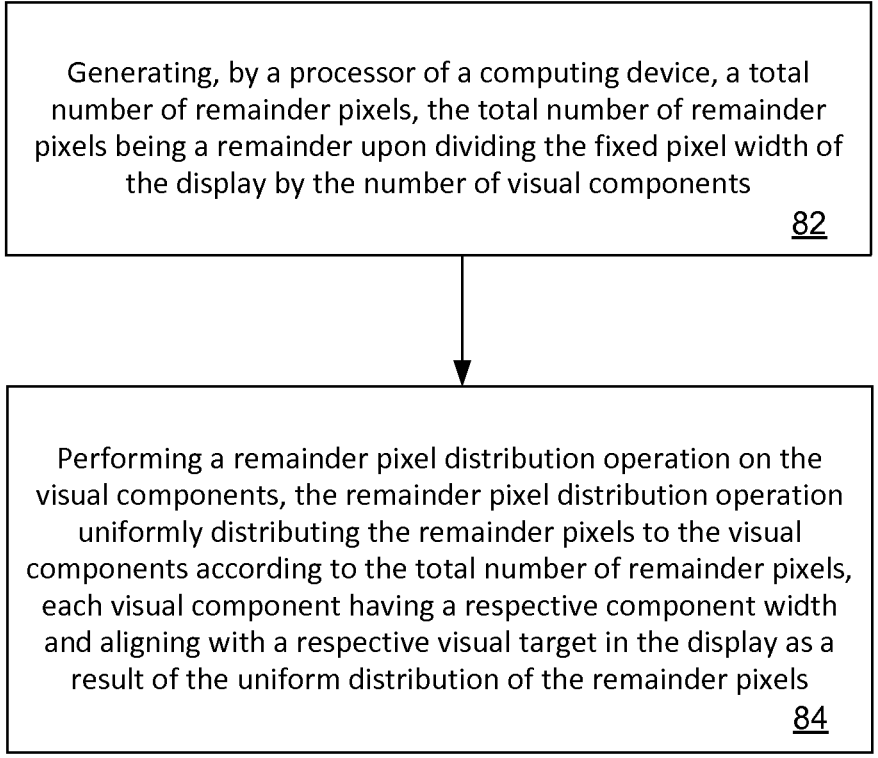

Generating, by a processor of a computing device, a total number of remainder pixels, the total number of remainder pixels being a remainder upon dividing the fixed pixel width of the display by the number of visual components

82

Performing a remainder pixel distribution operation on the visual components, the remainder pixel distribution operation uniformly distributing the remainder pixels to the visual components according to the total number of remainder pixels, each visual component having a respective component width and aligning with a respective visual target in the display as a result of the uniform distribution of the remainder pixels

84

UNIFORM DISTRIBUTION OF VISUAL COMPONENT WIDTHS

BACKGROUND

Heat maps provide a useful visual representation of numerical data that depends on either one or several independent variables. As an example, heat maps provide a visual representation of quantities such as storage allocations over a period of time that are relevant for monitoring data storage systems.

Heat maps that represent values of a single parameter like storage allocations over time may have discrete blocks that must be fit into a display window. For example, each block may contain a single color that represents a sampled data value in a particular fixed time interval. In this case, the number of blocks used may be the result of a tradeoff between having a sufficient number of samples of data and being able to resolve individual samples.

When distributing a number of blocks in a display of a specified number of pixels, conventional plotting programs divide the specified number of pixels by the number of blocks to get the widths of the blocks. If there is any remainder, such plotting techniques add that remainder to blocks at one boundary of the display, e.g., the left boundary. In some arrangements, plotting programs add the remainder to randomly selected components.

Plotting programs that use heat maps as described above frequently juxtapose a heat map with another type of plot, such as a line plot. Such juxtaposition may provide additional insight into the data.

SUMMARY

Unfortunately, there are deficiencies with the above-described conventional plotting programs. For example, the blocks of the heat map may be misaligned with an axis of a juxtaposed line plot because the widths of the blocks are not uniform over the display window. Rather than providing additional insight, such juxtaposition may hinder understanding of the data because the correspondences between the plots may be unclear.

In contrast with the above-described conventional, improved techniques involve uniformly distributing remainder pixels to the visual components when distributing the visual components in a display of a specified pixel width. When displaying a number of visual components on the display, an electronic device connected to the display generates remainder pixels that are the result of the quotient of the number of display pixels and the number of visual components not being a whole number. The electronic device then distributes the remainder pixels to the visual components in a uniform manner so that each visual component is aligned with a respective visual target in the display.

As an example, suppose that an electronic device that plots a heat map in a display 200 pixels in width is tasked with plotting 37 visual components that make up a heat map. The electronic device initially assigns 5 pixels to each visual component, leaving 15 remainder pixels for the 37 components. Rather than simply placing these pixels with the leftmost 15 visual components, or placing the pixels randomly among the visual components, the electronic device places a remainder pixel at every second or third visual component in a uniform manner according to the improved technique. The result is a set of visual components with widths that are uniformly distributed.

Advantageously, the improved techniques provide for placing the visual components in their intended places in the display, aligned with a visual target/Because the visual components are in their intended places, they will be aligned with, say, a line plot. Further, such techniques are impervious to a rescaling of the display window, which happens frequently in a drag-and-drop environment.

One embodiment of the improved technique is directed to a method of displaying a number of visual components in a display having a specified pixel width. The method includes generating, by a processor of a computing device, a total number of remainder pixels, the total number of remainder pixels being a remainder upon dividing the specified pixel width of the display by the number of visual components. The method also includes performing a remainder pixel distribution operation on the visual components, the remainder pixel distribution operation uniformly distributing the remainder pixels to the visual components according to the total number of remainder pixels, each visual component having a respective component width and aligning with a respective visual target in the display as a result of the uniform distribution of the remainder pixels.

Additionally, some embodiments of the improved technique are directed to an apparatus constructed and arranged to display a number of visual components in a display having a specified pixel width. The apparatus includes memory and a set of processors coupled to the memory to form controlling circuitry. The controlling circuitry is constructed and arranged to carry out the method of displaying a number of visual components in a display having a specified pixel width.

Furthermore, some embodiments of the improved technique are directed to a computer program product having a non-transitory computer readable storage medium which stores code including a set of instructions which, when executed by a computer, cause the computer to carry out the method of displaying a number of visual components in a display having a specified pixel width.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 4 is a flow chart illustrating another example method of carrying out the improved technique within the computing device shown in FIG. 1.

DETAILED DESCRIPTION

Improved techniques involve uniformly distributing remainder pixels to the visual components when distributing the visual components in a window (or other display area) of a display device, the window having a certain pixel width. When displaying a number of visual components on the display, an electronic device connected to the display generates remainder pixels that are the result of the quotient of the number of display pixels and the number of visual components not being a whole number. The electronic device then distributes the remainder pixels to the visual components in a uniform manner so that each visual component is aligned with a respective visual target in the display.

Advantageously, the improved techniques provide for intended positions of the visual components of a heat map or other plotting structure that uses such visual components. Because the visual components are in their intended places, they will be aligned with, say, a line plot. Further, such techniques are impervious to a rescaling of the display window, which happens frequently in a drag-and-drop environment.

Figure 1:
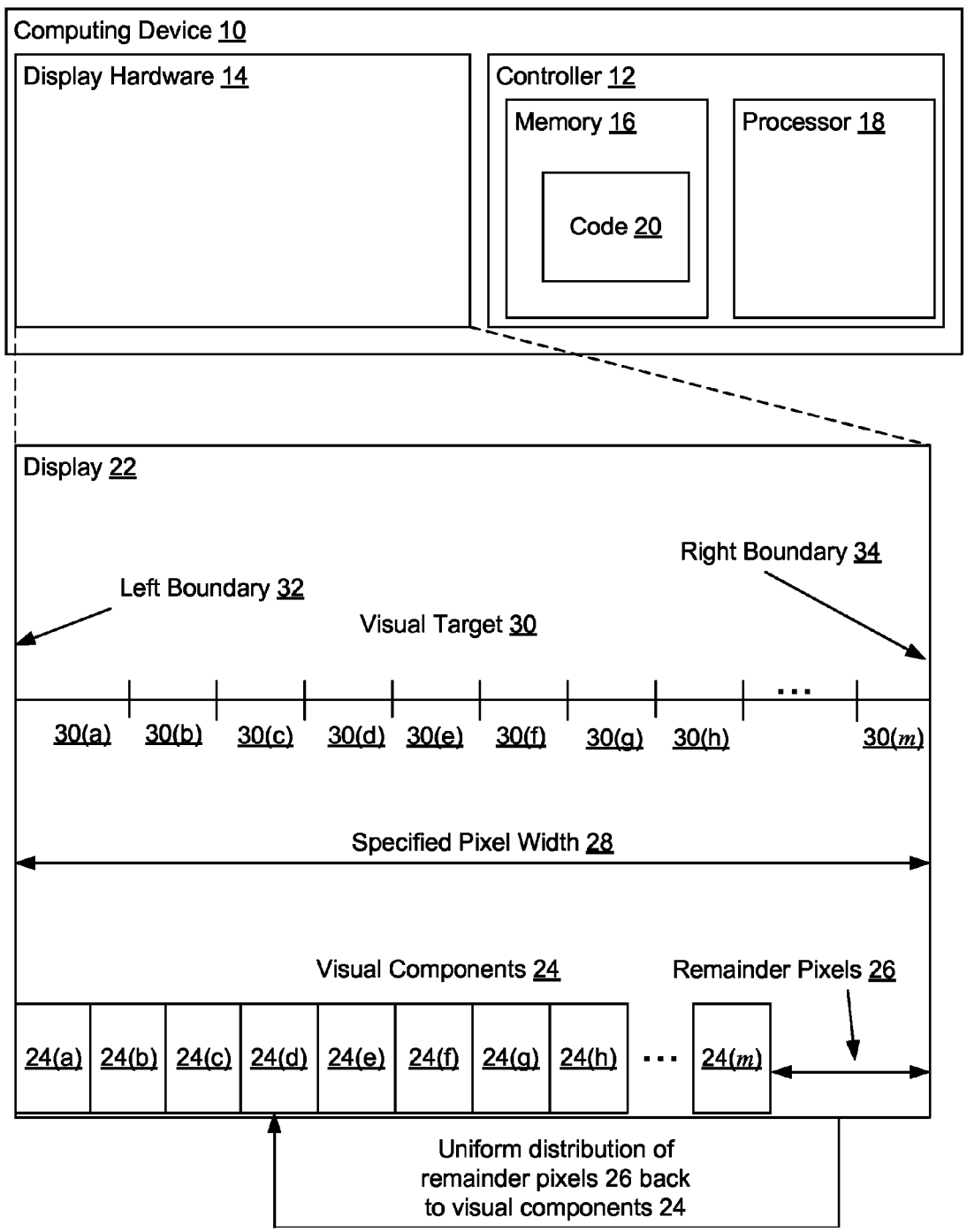
FIG. 1 is a block diagram illustrating an example computing device in which the improved technique may be carried out.

FIG. 1 illustrates an example computing device 10 in which the improved technique may be carried out. Computing device 10 includes controller 12, which in turn includes memory 16 and processor 18. Computing device 10 also includes display hardware 14.

Memory 16 is configured to store code 20 that contains instructions to display a number of visual components in a display having a specified pixel width. Memory 16 generally takes the form of, e.g., random access memory, flash memory, or a non-volatile memory.

Processor 18 takes the form of, but is not limited to, Intel or AMD-based CPUs, and can include a single or multi-cores each running single or multiple threads. Processor 18 is coupled to memory 16 and is configured to execute instructions from code 20.

Display hardware 14 is configured to transmit output to a display 22. Display hardware 14, in some arrangements, takes the form of a graphical processing unit (GPU). In other arrangements, display hardware 14 is contained within controller 12.

Display 22 is configured to show output from processor 18 and display hardware 14. Display 22 can take the form of a monitor, a projector, an LED screen, or the like.

Illustrated within display 22, are various display components from plotting software. The display components include visual components 24 (from, e.g., a routine that generates heat maps from data), and a visual target 30 from, e.g., an axis of a line plot of the same data used to create the heat map. Display 22 is shown in FIG. 1 to have a specified pixel width 28, i.e., the number of pixels across the width of display, and remainder pixels 26, which are the pixels left over after initially assigning pixels equally to visual components 24 because the quotient of specified pixel width 28 and the number of visual components 24 is not an integer. Display 22 also has a left boundary 32 and a right boundary 34. As depicted, the remainder pixels 26 are distributed in a uniform distribution 27 across visual components 24.

It should be understood that visual components 28 and visual target 30 can result from other graphics applications other than heat maps and line plots, respectively. For example, such visual components may occur when dealing with histograms, while any number of graphics with labels may correspond to visual target 30.

During operation, processor 18 receives a command from, e.g., a software application to plot data using a heat map and line plot. In response, processor 18 executes instructions from code 20 to generate visual components 24 and visual target 30 on display 22.

It should be understood that there may be several factors related to how many visual components 24 are generated by processor 18. For example, the number of visual components 24 may be determined from settings in the software application that control the fineness of the sampling of the data used to generate the heat map. Also, the number of visual components 24 may be determined from requirements in connection with consumption of memory 16.

Once the number of visual components 24 has been determined, processor 16 determines the width of each visual component 24. Further details of the determination of the width of each visual component 24 are described below in connection with FIG. 2.

Figure 2:
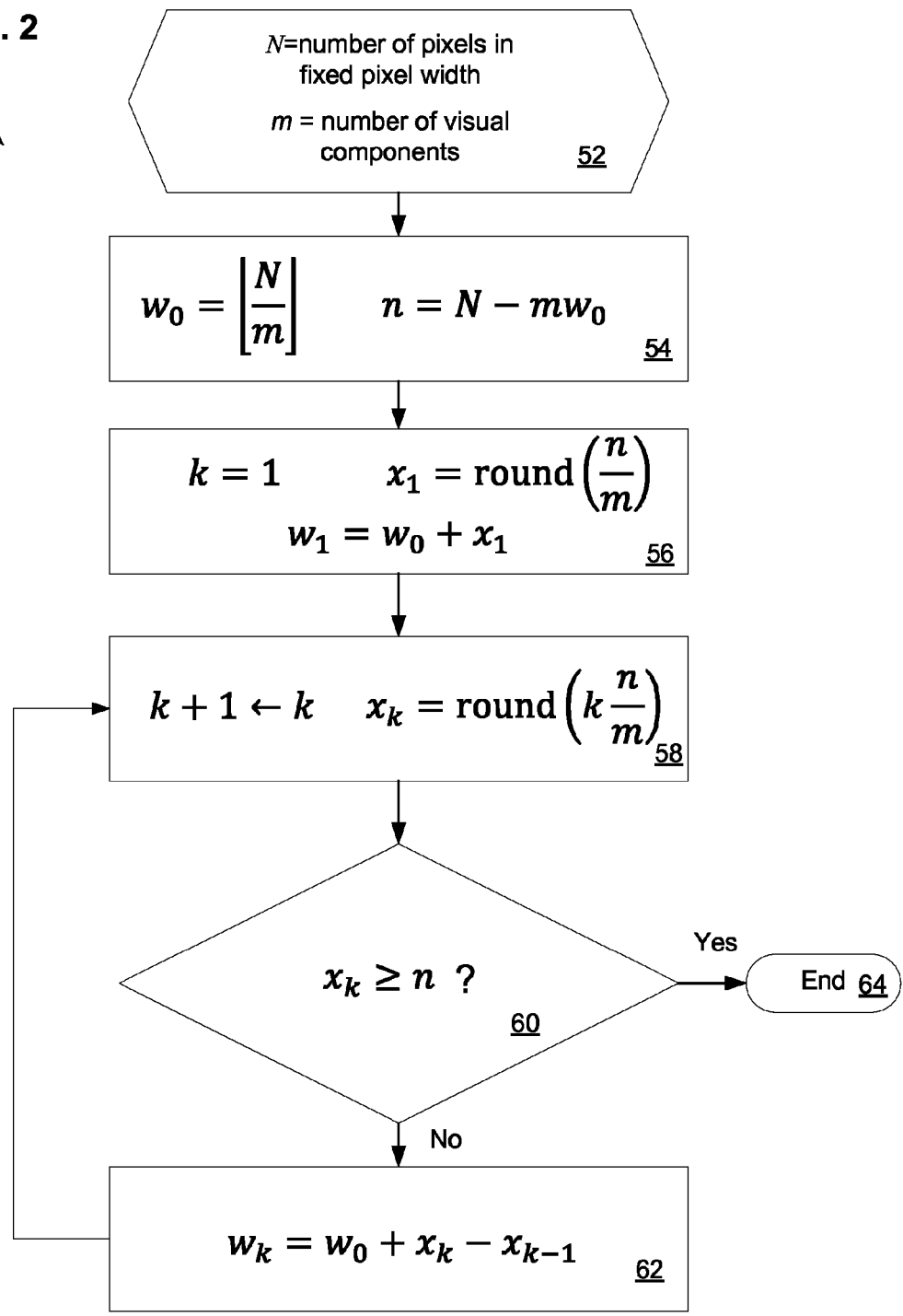
FIG. 2 is a flow chart illustrating an example process for uniform distribution of remainder pixels within the computing device shown in FIG. 1.

FIG. 2 illustrates a flow chart detailing a process 50 in which processor 18 determines the widths of visual components 24 according to the improved techniques. Process 50 involves the steps 52, 54, 56, 58, 60, 62, and 64.

In step 52, processor 18 obtains the number of pixels in specified pixel width, N, and the number of visual components 24, m, and stores them in registers in memory 16.

In step 54, processor 18 executes instructions from code 20 to compute the initial width of each visual component 24, $w_0$, and the number n of remainder pixels 26. In some arrangements, processor 18 executes instructions from code 20 to compute the initial width of each visual component 24 according to the following equation $$w_0 = \left\lfloor \frac{N}{m} \right\rfloor,$$

where the brackets indicate a floor function, where $\lfloor x \rfloor$ is the greatest integer smaller than x. In some arrangements, processor 18 also executes instructions from code 20 to compute the number of remainder pixels number n of remainder pixels 26 according to the following equation:

$$n = N - m\, w_0.$$

In step 56, processor 18, having stored the values of $w_0$ and n in registers in memory 16, executes instructions from code 20 to create an integer index k in memory and sets the value of k to one. The index k represents the $k^{th}$ visual component being considered by processor in verifying how many of remainder pixels 26 that visual component should get. For example, the visual component associated with index value k=1 is visual component 24(a). Processor 18 then executes instructions from code 20 to compute the number of remainder pixels 26 that are added visual component 24(a) according to the following equation:

$$x_1 = \text{round}\left(\frac{n}{m}\right)$$

where the round function, round (y), returns the value of the integer closest to y. (More specifically, the round function returns $\lfloor y \rfloor$ when $y - \lfloor y \rfloor < 0.5$ and $\lfloor y \rfloor + 1$ when $y - \lfloor y \rfloor \geq 0.5$.) Processor 18 stores this value of $x_1$ in a register in memory 16. Processor 18 then executes instructions from code 20 to compute the width $w_1$ of visual component 24(a) according to $$w_1 = w_0 + x_1.$$

Processor 18 stores this value of $w_1$ in a register in memory 16.

For the following step, we assume an arbitrary value of the index k.

In step 58, processor 18 executes instructions from code 20 to increment the value of index k stored in memory 16; this incrementing of the index corresponds to the consideration of the next visual component, say, 24(b) when the previous visual component is 24(a), and so on. Processor 18 then executes instructions from code 20 to compute the net number $x_k$ of remainder pixels 26 that have been added to visual components 24, including the current visual component 24(k), according to $$x_k = \text{round}\left(\frac{kn}{m}\right).$$

In step 60, processor 18 executes instructions from code 20 to determine whether $x_k$ exceeds the total number n of remainder pixels 26. If $x_k<n$, i.e., there are still remainder pixels 26 left to distribute, then, in step 62, processor 18 executes instructions from code 20 to compute the width $w_k$ of this $k^{th}$ visual component 24(k) according to the following equation:

$$w_k = w_0 + x_k - x_{k-1},$$

where $x_{k-1}$ is the previous number of remainder pixels 26 that have been added to visual components 24. Once this calculation has completed, then processor 18, in some arrangements, replaces the value $x_{k-1}$ in memory 16 by $x_k$ and proceeds to carry out step 58 again. If processor 18 proceeds back to step 58, then the current value of $x_k$ will serve as the next value of $x_{k-1}$. If, on the other hand, all of remainder pixels 26 have been distributed, i.e., $x_k \geq n$, then process 50 stops at step 64.

As an example, consider the case where N=200 and m=37. In this case, following process 50, we find that an extra pixel will be added to visual components 2, 4, 7, 9, 12, 14, 17, 19, 21, 24, 26, 29, 31, 34, and 36. That is, these visual components will have widths of 6 pixels, while the others will have 5 pixels.

It should be understood that process 50 as illustrated in FIG. 2 only considered beginning from left boundary 32 of display 22 and moving rightward. In some arrangements, however, process 50 could start at right boundary 34 and move leftward. In other arrangements, process 50 could begin in the middle of visual components 24 and move either to the left or right.

In some arrangements, once remainder pixels 26 have been distributed, processor 18 verifies that visual components 24 are indeed aligned with visual target 30. Further details of such an alignment are discussed below in connection with FIG. 3.

Figure 3:
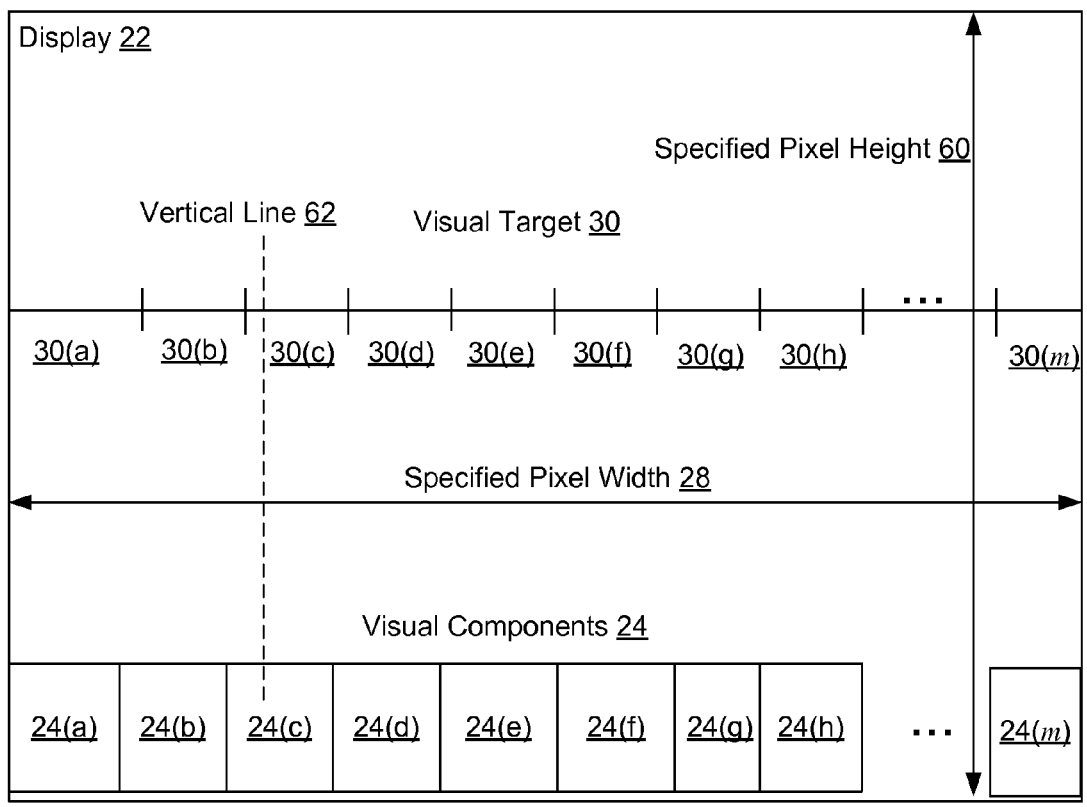
FIG. 3 is a block diagram illustrating an example display within the computing device shown in FIG. 1.

FIG. 3 illustrates display 22 with remainder pixels 26 having been distributed to visual components 24 according to process 50. It should be understood that, while in most cases there is no way for each visual component 24 to have exactly the same width as the other visual components, it is possible with to align each visual component 24 with a visual target 30 with the derived remainder pixel distribution scheme described above.

As an example, suppose, in continuing the above example, that visual target 30 is the horizontal axis of a line plot having a particular range. To compare visual target 30 with visual components 24, one breaks up visual target 30 into 37 sections, each section corresponding to a visual component that should be directly below that section. Ideally, then each vertical line 62 drawn through that section of visual target 30 also goes through its respective visual component 24. Because there still may be mismatches locally, not all vertical lines through one section of target 30 will go through the same visual component 24. Nevertheless, a clear majority of such vertical lines 62 should go through in a random sample of such vertical lines. One may declare visual components 24 aligned with visual target 30 when, say, more than 90% of such vertical lines 62 so through the correct visual component 24.

It should be understood that, in some arrangements, in addition to specify the widths of visual components in one direction, processor 18 may also be configured to determine heights of visual components 24 in another dimension, e.g., vertical. In such a case, there is a specified pixel height 60 in addition to specified pixel width 28. To determine such heights of visual components 24, processor 18 follows process 50 almost exactly the same way. An exception, however, is that because at least one visual component 24 is common in both horizontal and vertical directions, the height of the first pixel is specified in relation to the width that that visual component.

FIG. 4 illustrates a method 80 of displaying a number of visual components in a display having a specified pixel width, including steps 82 and 84. In step 82, a total number of remainder pixels, e.g., remainder pixels 26, is generated, the total number of remainder pixels being a remainder upon dividing the specified pixel width of the display, e.g., specified width 28, by the number of visual components, e.g., visual components 24. In step 84, a remainder pixel distribution operation is performed on the visual components, the remainder pixel distribution operation uniformly distributing the remainder pixels to the visual components according to the total number of remainder pixels, each visual component having a respective component width and aligning with a respective visual target in the display as a result of the uniform distribution of the remainder pixels.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

It should be understood that the improvement described here has a number of applications, including providing a technique for displaying a number of visual components in a display having a specified pixel width.

Having described certain embodiments, numerous alternative embodiments or variations can be made. For example, the above discussion dealt mainly with uniformly distributing visual components 24 within a display window 22.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of displaying a number of visual components in a display having a specified pixel width, the method comprising:

generating, by a processor of a computing device, a total number of remainder pixels, the total number of remainder pixels being a remainder upon dividing the specified pixel width of the display by the number of visual components;

performing a remainder pixel distribution operation on the visual components, the remainder pixel distribution operation uniformly distributing the remainder pixels to the visual components according to the total number of remainder pixels, each visual component having a respective component width and aligning with a respective visual target in the display as a result of the uniform distribution of the remainder pixels; and generating, as an initial component width, a floor of a ratio of the specified pixel width of the display and the number of visual components;

wherein performing the remainder pixel distribution operation on the visual components includes, for each visual component:

generating a local number of remainder pixels, adding the local number of remainder pixels to the initial component width to produce the respective component width of that visual component, and halting the generation of the local number of remainder pixels when the number of assigned remainder pixels for a visual component is equal to the total number of remainder pixels.

2. A method as in claim 1, wherein the visual components are displayed within an underlying window in the display; and wherein the remainder pixel distribution operation is performed in response to a rescaling operation on the window.

3. A method of displaying a number of visual components in a display having a specified pixel width, the method comprising:

generating, by a processor of a computing device, a total number of remainder pixels, the total number of remainder pixels being a remainder upon dividing the specified pixel width of the display by the number of visual components;

performing a remainder pixel distribution operation on the visual components, the remainder pixel distribution operation uniformly distributing the remainder pixels to the visual components according to the total number of remainder pixels, each visual component having a respective component width and aligning with a respective visual target in the display as a result of the uniform distribution of the remainder pixels; and generating, as an initial component width, a floor of a ratio of the specified pixel width of the display and the number of visual components;

wherein performing the remainder pixel distribution operation on the visual components includes, for each visual component:

generating a local number of remainder pixels, and adding the local number of remainder pixels to the initial component width to produce the respective component width of that visual component; and wherein generating the local number of remainder pixels includes:

dividing the total number of remainder pixels by the number of visual components to produce a remainder pixel quotient, multiplying the remainder pixel quotient by an index number assigned to that visual component to produce an assigned pixel quotient, rounding the assigned pixel quotient to the nearest whole number to produce a number of assigned remainder pixels for that visual component, and setting the local number of remainder pixels to a difference between the number of assigned remainder pixels for that visual component and a number of assigned remainder pixels for a neighboring visual component.

4. A method as in claim 3, wherein a boundary visual component is a visual component that is adjacent to a boundary of the display; and wherein generating the local number of remainder pixels further includes:

setting the local number of remainder pixels to number of assigned remainder pixels for the boundary visual component.

5. A method as in claim 4, wherein the boundary visual component is adjacent to the left boundary of the display;

wherein the index number assigned to that visual component is equal to the one more than the number of visual components between that visual component and the left boundary of the display; and wherein setting the local number of remainder pixels to the difference between the number of assigned remainder pixels for that visual component and the number of assigned remainder pixels for a neighboring visual component includes:

generating, as the local number of remainder pixels, the difference between the number of assigned remainder pixels for that visual component and the number of assigned remainder pixels for the visual component to the left of that visual component.

6. A method as in claim 5, wherein the display also has a specified pixel height that is perpendicular to the specified pixel width;

wherein there are a number of visual height components to be displayed in the display over the specified pixel height of the display;

wherein the method further includes:

generating a total number of remainder height pixels, the total number of remainder pixels being a remainder upon dividing the specified pixel height of the display by the number of visual height components; and performing a remainder height pixel distribution operation on the visual height components, the remainder height pixel distribution operation uniformly distributing the remainder height pixels to the visual height components according to the total number of remainder height pixels, each visual height component having a respective component height and aligning with another respective visual target in the display as a result of the uniform distribution of the remainder height pixels; and wherein the respective height of a particular visual height component is specified to be the respective component width of a particular visual component.

7. A method as in claim 3, wherein the visual components are displayed within an underlying window in the display; and wherein the remainder pixel distribution operation is performed in response to a rescaling operation on the window.

8. A method of displaying a number of visual components in a display having a specified pixel width, the method comprising:

generating, by a processor of a computing device, a total number of remainder pixels, the total number of remainder pixels being a remainder upon dividing the specified pixel width of the display by the number of visual components;

performing a remainder pixel distribution operation on the visual components, the remainder pixel distribution operation uniformly distributing the remainder pixels to the visual components according to the total number of remainder pixels, each visual component having a respective component width and aligning with a respective visual target in the display as a result of the uniform distribution of the remainder pixels; and for each visual component, verifying that that visual component is aligned with the respective visual target in the display;

wherein the visual components form a heat map representing the dependence of a set of parameters on an independent parameter, each visual component representing a value of the independent parameter;

wherein, for each visual component, the respective visual target represents a section of an axis of a corresponding line plot, the section of the axis including the value of the independent parameter represented by that visual component; and wherein verifying that that visual component is aligned with the respective visual target in the display includes:
detecting whether a vertical line drawn through the section of the axis of the corresponding line plot intersects that visual component.

9. A method as in claim 8, wherein the visual components are displayed within an underlying window in the display; and wherein the remainder pixel distribution operation is performed in response to a rescaling operation on the window.

10. A computer program product having a non-transitory, computer-readable storage medium which stores instructions that, when executed by a controller, causes the controller to carry out a method of displaying a number of visual components in a display having a fixed pixel width, the method comprising:

generating a total number of remainder pixels, the total number of remainder pixels being a remainder upon dividing the fixed pixel width of the display by the number of visual components;

performing a remainder pixel distribution operation on the visual components, the remainder pixel distribution operation uniformly distributing the remainder pixels to the visual components according to the total number of remainder pixels, each visual component having a respective component width and aligning with a respective visual target in the display as a result of the uniform distribution of the remainder pixels; and generating, as an initial component width, a floor of a ratio of the specified pixel width of the display and the number of visual components;

wherein performing the remainder pixel distribution operation on the visual components includes, for each visual component:
generating a local number of remainder pixels, and adding the local number of remainder pixels to the initial component width to produce the respective component width of that visual component; and wherein generating the local number of remainder pixels includes:
dividing the total number of remainder pixels by the number of visual components to produce a remainder pixel quotient,
multiplying the remainder pixel quotient by an index number assigned to that visual component to produce an assigned pixel quotient,
rounding the assigned pixel quotient to the nearest whole number to produce a number of assigned remainder pixels for that visual component, and
setting the local number of remainder pixels to a difference between the number of assigned remainder pixels for that visual component and a number of assigned remainder pixels for a neighboring visual component.

11. A computer program product as in claim 10,
wherein a boundary visual component is a visual component that is adjacent to a boundary of the display; and
wherein generating the local number of remainder pixels further includes:
setting the local number of remainder pixels to number of assigned remainder pixels for the boundary visual component.

12. A computer program product as in claim 11,
wherein the boundary visual component is adjacent to the left boundary of the display;
wherein the index number assigned to that visual component is equal to the one more than the number of visual components between that visual component and the left boundary of the display; and
wherein setting the local number of remainder pixels to the difference between the number of assigned remainder pixels for that visual component and the number of assigned remainder pixels for a neighboring visual component includes:
generating, as the local number of remainder pixels, the difference between the number of assigned remainder pixels for that visual component and the number of assigned remainder pixels for the visual component to the left of that visual component.

13. A computer program product as in claim 12,
wherein the display also has a fixed pixel height that is perpendicular to the fixed pixel width;
wherein there are a number of visual height components to be displayed in the display over the fixed pixel height of the display;
wherein the method further includes:
generating a total number of remainder height pixels, the total number of remainder pixels being a remainder upon dividing the fixed pixel height of the display by the number of visual height components; and
performing a remainder height pixel distribution operation on the visual height components, the remainder height pixel distribution operation uniformly distributing the remainder height pixels to the visual height components according to the total number of remainder height pixels, each visual height component having a respective component height and aligning with another respective visual target in the display as a result of the uniform distribution of the remainder height pixels; and
wherein the respective height of a particular visual height component is fixed to be the respective component width of a particular visual component.

14. A method as in claim 10, wherein performing the remainder pixel distribution operation on the visual components further includes:

halting the generation of the local number of remainder pixels when the number of assigned remainder pixels for a visual component is equal to the total number of remainder pixels.

15. A computer program product as in claim 10, further comprising:
for each visual component, verifying that that visual component is aligned with the respective visual target in the display.

16. A computer program product as in claim 15,
wherein the visual components form a heat map representing the dependence of a set of parameters on an independent parameter, each visual component representing a value of the independent parameter;
wherein, for each visual component, the respective visual target represents a section of an axis of a corresponding line plot, the section of the axis including the value of the independent parameter represented by that visual component; and
wherein verifying that that visual component is aligned with the respective visual target in the display includes:
detecting whether a vertical line drawn through the section of the axis of the corresponding line plot intersects that visual component.

17. A computer program product as in claim 10, wherein the visual components are displayed within an underlying window in the display; and
wherein the remainder pixel distribution operation is performed in response to a rescaling operation on the window.

18. An apparatus constructed and arranged to display a number of visual components, the apparatus comprising:
a display having a specified pixel width assigned to display the visual components;
memory; and
a controller including controlling circuitry coupled to the memory, the controlling circuitry being constructed and arranged to:
generate a total number of remainder pixels, the total number of remainder pixels being a remainder upon dividing the fixed pixel width of the display by the number of visual components;
perform a remainder pixel distribution operation on the visual components, the remainder pixel distribution operation uniformly distributing the remainder pixels to the visual components according to the total number of remainder pixels, each visual component having a respective component width and aligning with a respective visual target in the display as a result of the uniform distribution of the remainder pixels; and
generate, as an initial component width, a floor of a ratio of the specified pixel width of the display and the number of visual components;
wherein the controlling circuitry constructed and arranged to perform the remainder pixel distribution operation on the visual components is further constructed and arranged to, for each visual component:
generate a local number of remainder pixels,
add the local number of remainder pixels to the initial component width to produce the respective component width of that visual component, and
halt the generation of the local number of remainder pixels when the number of assigned remainder pixels for a visual component is equal to the total number of remainder pixels.

19. An apparatus as in claim 18, wherein the visual components are displayed within an underlying window in the display; and
wherein the remainder pixel distribution operation is performed in response to a rescaling operation on the window.

* * * * *